(12) United States Patent
Rahman et al.

(10) Patent No.: US 8,531,973 B2
(45) Date of Patent: *Sep. 10, 2013

(54) METHOD AND SYSTEM FOR FAULT DETECTION USING ROUND TRIP TIME

(71) Applicant: AT & T Intellectual Property I, L.P., Atlanta, GA (US)

(72) Inventors: Moshiur Rahman, Marlboro, NJ (US); Paritosh Bajpay, Edison, NJ (US)

(73) Assignee: AT & T Intellectual Property I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/687,824

(22) Filed: Nov. 28, 2012

(65) Prior Publication Data

US 2013/0088975 A1 Apr. 11, 2013

Related U.S. Application Data

(63) Continuation of application No. 12/645,825, filed on Dec. 23, 2009, now Pat. No. 8,363,554.

(51) Int. Cl.
*H04J 1/16* (2006.01)

(52) U.S. Cl.
USPC .......................... 370/241; 370/242; 370/252

(58) Field of Classification Search
USPC .............. 370/229, 216, 230, 235, 252, 253, 370/350, 395.2, 328, 310, 346, 469, 449, 370/509, 455, 410, 423, 451, 450, 404.2, 370/452.1, 456.1, 67.11, 403, 241, 242, 245; 709/222, 228, 245, 224; 379/201.01
See application file for complete search history.

(56) References Cited

U.S. PATENT DOCUMENTS

| | | | |
|---|---|---|---|
| 6,323,981 B1 * | 11/2001 | Jensen | 398/11 |
| 6,363,056 B1 * | 3/2002 | Beigi et al. | 370/252 |
| 7,197,014 B2 * | 3/2007 | Katsuyama et al. | 370/252 |
| 7,489,691 B2 * | 2/2009 | Wigard et al. | 370/395.42 |
| 7,539,497 B2 * | 5/2009 | Beale | 455/451 |
| 7,782,767 B1 * | 8/2010 | Lin et al. | 370/229 |
| 7,882,268 B1 * | 2/2011 | Broido | 709/245 |
| 2002/0004379 A1 * | 1/2002 | Gruhl et al. | 455/403 |
| 2004/0258012 A1 * | 12/2004 | Ishii | 370/328 |
| 2007/0070973 A1 * | 3/2007 | Kazmi | 370/350 |
| 2008/0062997 A1 * | 3/2008 | Nix | 370/395.2 |
| 2008/0146160 A1 * | 6/2008 | Jiang et al. | 455/67.11 |
| 2008/0318587 A1 * | 12/2008 | Barrett | 455/452.1 |
| 2009/0089441 A1 * | 4/2009 | Taylor et al. | 709/228 |
| 2010/0057895 A1 * | 3/2010 | Huang | 709/222 |
| 2010/0120397 A1 * | 5/2010 | Kazmi et al. | 455/410 |
| 2010/0234014 A1 * | 9/2010 | Virkki et al. | 455/423 |
| 2010/0240389 A1 * | 9/2010 | Harper et al. | 455/456.1 |
| 2011/0047029 A1 * | 2/2011 | Nair et al. | 705/14.52 |

* cited by examiner

*Primary Examiner* — Abdullah Riyami
(74) *Attorney, Agent, or Firm* — Fay Kaplun & Marcin, LLP.

(57) ABSTRACT

A computer readable storage medium stores a set of instructions executable by a processor. The set of instructions is operable to receive, from a user device, a query relating to a degradation of performance of the device within a network; receive, from a transceiver station, a record relating to a time to send data to the device; and identify the existence of an error in the device based on a determination that the time is greater than a predetermined threshold.

20 Claims, 2 Drawing Sheets

METHOD AND SYSTEM FOR FAULT DETECTION USING ROUND TRIP TIME

BACKGROUND

Fault detection is an important part of the operation and maintenance of wireless networks. However, even once it has been determined that a fault exists, faults must be isolated before they can be addressed and repaired. In particular, it is important to distinguish between faults that exist at the network level and faults in user equipment.

SUMMARY OF THE INVENTION

A computer readable storage medium stores a set of instructions executable by a processor. The set of instructions is operable to receive, from a user device, a query relating to a degradation of performance of the device within a network; receive, from a transceiver station, a record relating to a time to send data to the device; and identify the existence of an error in the device based on a determination that the time is greater than a predetermined threshold.

A network device includes a memory and a processor. The processor is configured to receive, from a user device, a query relating to a degradation of performance of the device within a network. The processor is further configured to receive, from a transceiver station, a record relating to a time to send data to the device. The processor is further configured to identify the existence of an error in the device based on a determination that the time is greater than a predetermined threshold.

DETAILED DESCRIPTION

Figure 1:
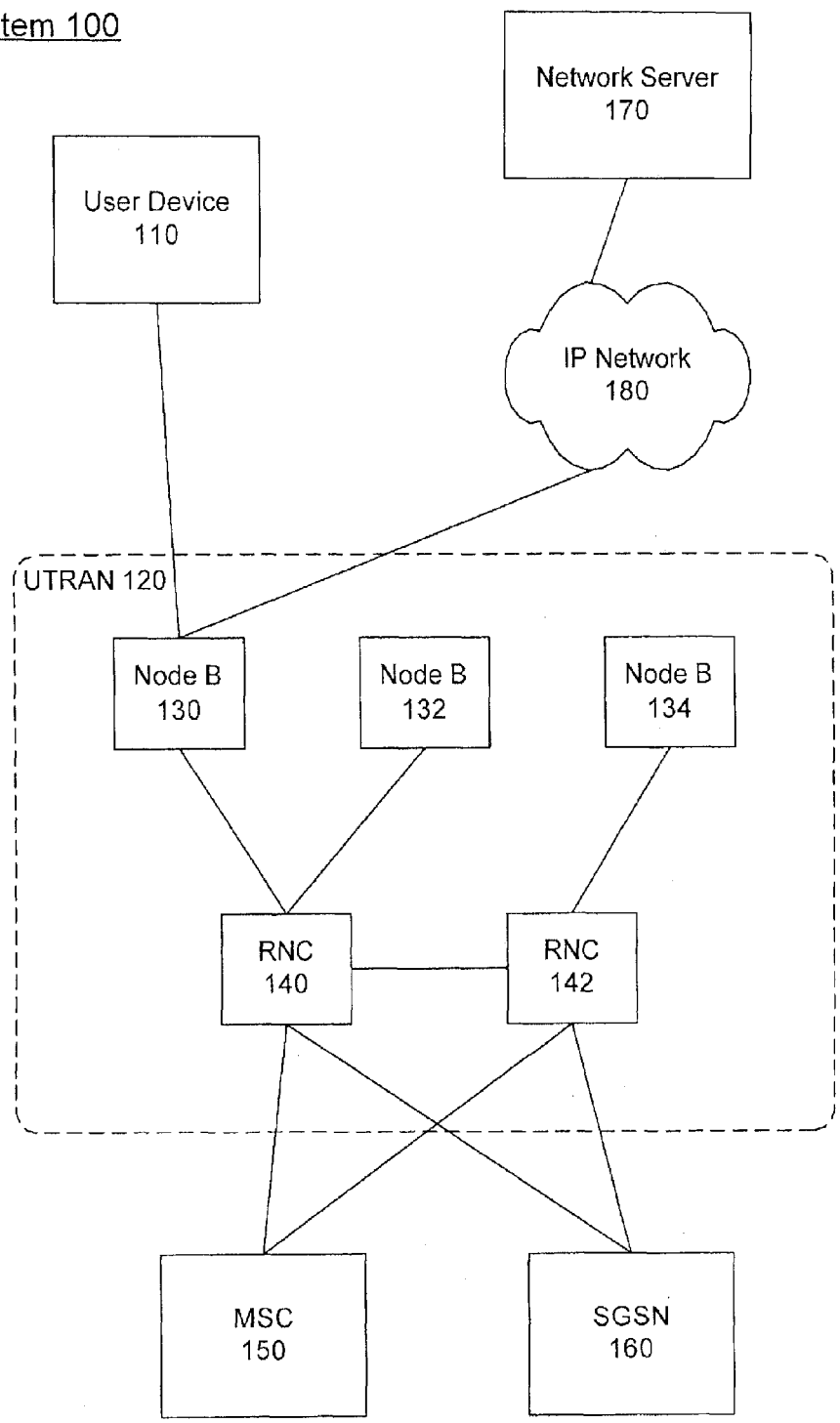
FIG. 1 shows an exemplary communications network.

The exemplary embodiments may be further understood with reference to the following description and the appended drawings, wherein like elements are referred to with the same reference numerals. The exemplary embodiments describe methods and systems for detecting and isolating the source of network faults.

Troubleshooting of networks includes both fault detection and isolation of detected faults. In particular, it may be beneficial to isolate faults that are local to user equipment, rather than to network equipment, in order not to dedicate resources to network faults that may not exist, but rather to alert a user to the presence of faults in user equipment and thereby enable fault resolution to occur as quickly as possible. The exemplary embodiments present methods and systems by which faults that are local to user equipment may be detected and isolated in response to a request that has been initiated from the user equipment itself.

FIG. 1 illustrates an exemplary system 100. The system 100 includes a user device 110, which may include, for example, a mobile phone, a smart phone, a palmtop computer, or any other type of user device that may perform and benefit from the exemplary embodiments. The user device 110 may be in communication with a UMTS terrestrial radio access network ("UTRAN") 120. The UTRAN 120 may include a plurality of Node B elements 130, 132 and 134, which may be in direct communication with user equipment; in this exemplary embodiment, the user device 110 is currently communicating with the Node B 130.

The Node B elements 130, 132 and 134 may, in turn, be controlled by one or more radio network controllers ("RNC"), such as RNC 140 and 142. These may coordinate the flow of data from the user device 110 and other user devices to other points in the network, and vice versa. The RNC 140 and 142 may be in communication with a mobile switching center ("MSC") 150 and a serving GPRS support node ("SGSN") 160, both of which may further coordinate network traffic. The UTRAN 120 may further be operated by a network server 170, with communications to and from the network server 170 occurring via an IP network 180. Those of skill in the art will understand that the system 100 is only exemplary and that the broader principles described herein may be applied to any type of network.

Figure 2:
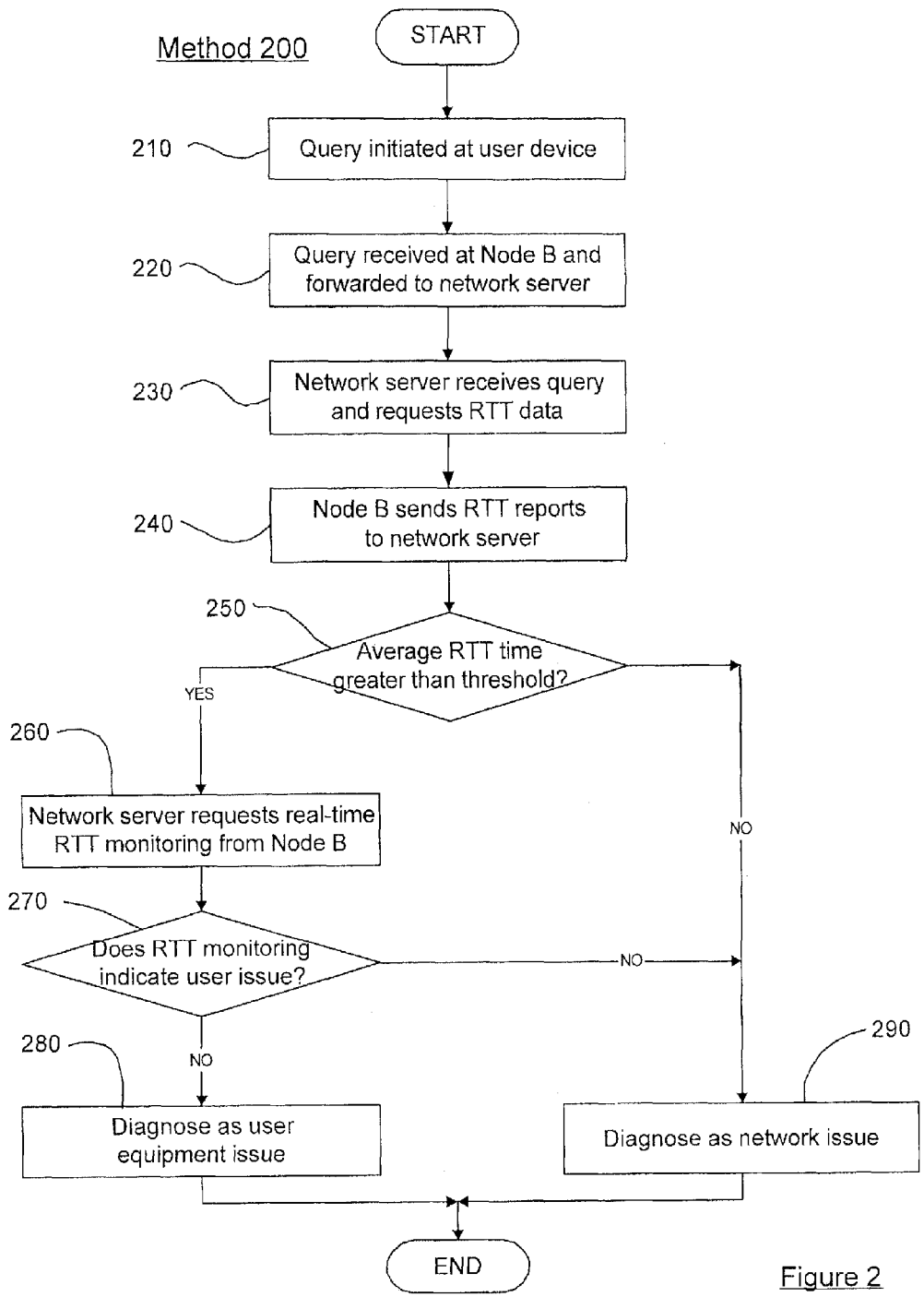
FIG. 2 shows an exemplary method for detecting and isolating faults in a communications network such as the network of FIG. 1.

FIG. 2 illustrates an exemplary method 200 by which faults in user equipment may be detected and isolated. The method 200 will be described specifically with reference to the system 100 of FIG. 1, but those of skill in the art will understand that the method 200 may also be applicable to other types of user equipment. In step 210, a query is initiated at the user device 110. This may occur due to an action by a user of the device in response to a degradation in performance or may be initiated automatically by a device that has detected a similar degradation of performance. In step 220, the query is received by the Node B 130, which may be specifically configured to handle such queries, and, in response, forwards the query directly to the network server 170 by using an IP address of the network server 170. This may be accomplished without forwarding the query to RNC 140 and 142.

In step 230, the network server 170 receives the query that has been forwarded by the Node B 130 in step 220 and, in response, requests, from the Node B 130, round trip time ("RTT") measurement reports relating to the querying user device 110. RTT along the interface between the user device 110 and the Node B 130 may be defined as the time measured between sending a downlink frame to the user device 110 and receiving the appropriate uplink frame from the user device 110, on the first detected path in the case of multi-path receiving. In step 240, the Node B 130 sends the requested RTT reports to the network server 170. RTT reports provided may be, for example, all reports over a most recent predetermined period of time, e.g., the last five minutes.

In step 250, the network server 170 calculates an average RTT and determines whether the average RTT is greater than a predetermined threshold value. The threshold value may typically be customizable based on the preferences of a service provider and the characteristics of the network. If the average RTT is greater than the predetermined threshold value, the method continues in step 260; if the average RTT is less than the threshold value, the method continues in step 290, which will be discussed below.

In step 260, the network server 170 requests and receives real-time RTT monitoring from the Node B 130, in order to provide further data that may be used to diagnose the network issues that resulted in the initial query in step 210. Upon receiving real-time RTT monitoring data, in step 270, the network server 170 may determine the root cause of the network issues. In one exemplary embodiment, the network server 170 may perform an algorithm to determine the cause of the network issues based on this monitoring. In one embodiment, such an algorithm may involve prompting the Node B 130 to send a test message to the user device 110 and determine whether an acknowledgement is received from the user device 110. If an acknowledgement is not received, or is received late, the network server 170 may then determine that the failure is localized to the user device 110 or to the link between the user device 110 and the node B 130, rather than elsewhere within the system 100.

If, in step 270, the network server 170 determines that the root cause of the network issues lies with the user equipment 110, then, in step 280, the network server 170 notifies the user device 110, via the Node B 130 or by other means, that the fault has been isolated to the user device 110 itself. This step may optionally also include automated troubleshooting that may be conducted either remotely by the network server 170, or locally by the user device 110 in response to receiving a notification of a local issue from the network server 170. Alternately, if the network server 170 determines that the root cause of the issues lies with the network (e.g., within UTRAN 120, with the MSC 150, with the SGSN 160, with the network server 170, etc.), then in step 290, the network server 170 notifies network maintenance personnel about the issues in order that they may be resolved at the network level. After step 280 or step 290, the method terminates.

The exemplary embodiments may thus enable a determination to be made, at the network level, as to whether a problem is due to a fault in network equipment or in user equipment. Further, this determination may be made without the use of a network controller, such as RNC 140 and 142 of FIG. 1. The exemplary embodiments may also enable automated troubleshooting to proceed upon making a determination that a problem lies with the user equipment. By providing users with notification of a problem that is local to their user devices, and providing automated troubleshooting, a high level of user satisfaction may be achieved.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalents.

What is claimed is:

1. A non-transitory computer readable storage medium including a set of instructions executable by a processor, the set of instructions, when executed by the processor, causing the processor to perform operations comprising:
   receiving, from a user device, a query relating to a degradation of performance of the user device within a network;
   sending, to a network server, a record relating to a time to send data to the user device;
   receiving, from the network server, a request for real-time monitoring of time to send data to the user device in response to a determination by the network server that the time is greater than a predetermined threshold; and
   performing real-time monitoring of time to send data to the user device,
   wherein an identification of an error in the user device is made based on the real-time monitoring.

2. The non-transitory computer readable storage medium of claim 1, wherein the time related in the record relates to a round trip time.

3. The non-transitory computer readable storage medium of claim 2, wherein the round trip time is a time measured between sending a downlink frame to the user device and receiving a corresponding uplink frame from the user device.

4. The non-transitory computer readable storage medium of claim 1, wherein the time related in the record is an average of a plurality of times to send data to the user device.

5. The non-transitory computer readable storage medium of claim 1, wherein the identification of the error in the user device is based on a comparison of the real-time monitoring of the time to send data to the device to the predetermined threshold.

6. The non-transitory computer readable storage medium of claim 1, wherein the network is one of a terrestrial radio access network and a satellite network.

7. The non-transitory computer readable storage medium of claim 1, wherein the user device includes one of a mobile phone, a smart phone, a mobile computer, a personal digital assistant and a handheld computer.

8. The non-transitory computer readable storage medium of claim 1, wherein the identification of the error in the user device is made by the network server.

9. The non-transitory computer readable storage medium of claim 1, wherein the identification of the error in the user device is made without receiving data from a radio network controller.

10. A network device, comprising:
    a memory storing a set of instructions; and
    a processor executing the set of instructions to perform operations comprising:
      receiving, from a user device, a query relating to a degradation of performance of the user device within a network;
      sending, to a network server, a record relating to a time to send data to the user device;
      receiving, from the network server, a request for real-time monitoring of time to send data to the user device in response to a determination by the network server that the time is greater than a predetermined threshold; and
      performing real-time monitoring of time to send data to the user device,
      wherein an identification of an error in the user device is made based on the real-time monitoring.

11. The network device of claim 10, wherein the time related in the record relates to a round trip time.

12. The network device of claim 11, wherein the round trip time is a time measured between sending a downlink frame to the user device and receiving a corresponding uplink frame from the user device.

13. The network device of claim 10, wherein the time related in the record is an average of a plurality of times to send data to the user device.

14. The network device of claim 10, wherein the identification of the error in the user device is based on a comparison of the real-time monitoring of the time to send data to the device to the predetermined threshold.

15. The network device of claim 10, wherein the network is one of a terrestrial radio access network and a satellite network.

16. The network device of claim 10, wherein the user device includes one of a mobile phone, a smart phone, a mobile computer, a personal digital assistant and a handheld computer.

17. The network device of claim 10, wherein the identification of the error in the user device is made by the network server.

18. The network device of claim 10, wherein the identification of the error in the user device is made without receiving data from a radio network controller.

19. A method, comprising:
    receiving, from a user device, a query relating to a degradation of performance of the user device within a network;
    sending, to a network server, a record relating to a time to send data to the user device;

receiving, from the network server, a request for real-time monitoring of time to send data to the user device in response to a determination by the network server that the time is greater than a predetermined threshold; and performing real-time monitoring of time to send data to the user device, wherein an identification of an error in the user device is made based on the real-time monitoring.

20. The method of claim 19, wherein the time related in the record relates to a round trip time.

* * * * *